US007785038B2

(12) United States Patent
Block et al.

(10) Patent No.: US 7,785,038 B2
(45) Date of Patent: Aug. 31, 2010

(54) OXIDATION OF ORGANIC COMPOUNDS

(75) Inventors: Philip A. Block, Garnet Valley, PA (US); Richard A. Brown, Lawrenceville, NJ (US)

(73) Assignee: FMC Corporation, Philadelphia, PA (US)

( * ) Notice: Subject to any disclaimer, the term of this patent is extended or adjusted under 35 U.S.C. 154(b) by 3 days.

(21) Appl. No.: 12/089,735

(22) PCT Filed: Oct. 20, 2006

(86) PCT No.: PCT/US2006/041076
§ 371 (c)(1),
(2), (4) Date: Apr. 10, 2008

(87) PCT Pub. No.: WO2007/047946
PCT Pub. Date: Apr. 26, 2007

(65) Prior Publication Data
US 2008/0264876 A1    Oct. 30, 2008

Related U.S. Application Data

(60) Provisional application No. 60/728,626, filed on Oct. 20, 2005.

(51) Int. Cl.
*B09C 1/00* (2006.01)
(52) U.S. Cl. .................................. 405/128.1; 588/320
(58) Field of Classification Search ............ 405/128.1, 405/128.75; 588/320
See application file for complete search history.

(56) References Cited

U.S. PATENT DOCUMENTS

| | | | | |
|---|---|---|---|---|
| 4,230,595 A | * | 10/1980 | Yamaji et al. | 252/188.28 |
| 5,286,141 A | * | 2/1994 | Vigneri | 405/128.5 |
| 5,849,201 A | * | 12/1998 | Bradley | 210/752 |
| 6,019,548 A | | 2/2000 | Hoag | |
| 6,306,641 B1 | | 10/2001 | Horn | |
| 6,474,908 B1 | | 11/2002 | Hoag | |
| 6,569,353 B1 | * | 5/2003 | Giletto et al. | 252/186.28 |
| 6,719,902 B1 | | 4/2004 | Alvarez | |
| 2005/0006094 A1 | * | 1/2005 | Sorenson, Jr. | 166/281 |
| 2008/0272063 A1 | * | 11/2008 | Boulos et al. | 210/759 |

OTHER PUBLICATIONS

Finlay et al, "Effect of Zero—Valent Iron on Groundwater Containing . . . " [online]Bioremediation Consulting Inc., Retrieved on Jul. 14, 2004 from internet at www.bcilabs.com/zero-valent-iron.html, Watertown, MA.
Tratnyek et al, "Chemistry of Contaminant Reduction with Zero-Valent Iron Metal". [online] Center for Groundwater Research, Retrieved from internet on Jul. 14, 2004 at http://cgr.ese.ogi.edu/iron/ Beaverton, OR.
Liang et al, "Research and Demonstration Using Zero Valent Iron in . . . " [online] Oak Ridge National Laboratory's Environmental Sciences Division, Retrieved from internet on Jul. 14, 2004 at www. esd.ornl.gov/research/liang_highlight.html.

* cited by examiner

*Primary Examiner*—John Kreck

(57) ABSTRACT

An improved method and compositions for treating organic compounds present in soil, groundwater and other environments is disclosed. The method involves the use of a composition comprising a solid state, water soluble peroxygen compound and zero valent iron.

13 Claims, No Drawings

OXIDATION OF ORGANIC COMPOUNDS

This application claims the benefit of U.S. Provisional Application No. 60/728,626 filed Oct. 20, 2005.

FIELD OF THE INVENTION

The present invention relates to the in situ and ex situ oxidation of organic compounds in soils as well as waters such as groundwater, process water and wastewater. The invention particularly relates to the in situ oxidation of volatile and semi-volatile organic compounds, pesticides and herbicides, and other recalcitrant organic compounds in soil and groundwater.

BACKGROUND OF THE INVENTION

The contamination of subsurface soils and groundwater by volatile organic compounds (VOCs), semi volatile organic compounds (SVOCs) as well as herbicides and pesticides is a well-documented problem. Many VOC and SVOC contaminates migrate through soil under the influence of gravity to contaminate groundwater as the water passes through the contaminated soil. Notable among these are the volatile organic compounds or VOCs which include any at least slightly water soluble chemical compound of carbon, with a Henry's Law Constant greater than $10^{-7}$ atm $m^3$/mole, which is toxic or carcinogenic, is capable of moving through the soil under the influence of gravity and serving as a source of water contamination by dissolution into water passing through the contaminated soil due to its solubility, including, but not limited to, chlorinated solvents such as trichloroethylene (TCE), vinyl chloride, tetrachloroethylene (PCE), methylene chloride, 1,2-dichloroethane, 1,1,1-trichloroethane (TCA), 1,1-dichloroethane, 1,1-dichloroethene, carbon tetrachloride, benzene, chloroform, chlorobenzenes, and other compounds such as ethylene dibromide, and methyl tertiary butyl ether.

Many VOC and SVOC contaminates also are toxic or carcinogenic. These VOCs and SVOC's contaminates include, but are not limited to, chlorinated solvents such as trichloroethylene (TCE), vinyl chloride, tetrachloroethylene (PCE), methylene chloride, 1,2-dichloroethane, 1,1,1-trichloroethane (TCA), carbon tetrachloride, chloroform, chlorobenzenes. Other examples of VOCs and SVOCs include benzene, toluene, xylene, ethyl benzene, ethylene dibromide, methyl tertiary butyl ether, polyaromatic hydrocarbons, polychlorobiphenyls, phthalates, 1,4-dioxane, nitrosodimethyl amine, and methyl tertbutyl ether.

The discharge of VOC and SVOC contaminates such as those listed into soil leads to contamination of aquifers and degrades groundwater resources for future use. Treatment and remediation of soils contaminated with VOCs or SVOCs is expensive and is often unsuccessful. For example, remediation of soils contaminated with VOCs which are partially or completely immiscible with water is particularly difficult. Also remediation of soils contaminated with highly soluble but biologically stable organic contaminants such as MTBE and 1,4-dioxane is very difficult with conventional technologies. Non-aqueous phase liquids ("NAPL") present in the soil subsurface can be toxic and can slowly release dissolved VOCs to groundwater to generate long-term (i.e., decades or longer) sources of contamination of the soil subsurface. Indeed, plumes of subsurface groundwater contaminant may extend hundreds to thousands of feet from the source of the chemical contaminate. The chemical contaminates may then be transported into drinking water sources, lakes, rivers, and even basements of homes through volatilization from groundwater.

The art has attempted to address remediation of soil and groundwater contaminated with VOCs and SVOCs. U.S. Pat. No. 6,474,908 (Hoag, et al) and U.S. Pat. No. 6,019,548 (Hoag, et al) teach the use of persulfate with divalent transition metal salt catalyst to destroy VOC's in soil. A disadvantage of this technique, however, is that the divalent transition metals upon oxidation and/or hydrolysis may undergo precipitation. This limits the survivability and transport of the transition metal catalyst, and hence the reactivity of the persulfate to the field of contamination. Iron (III) is known to catalyze reactions of hydrogen peroxide. (Hydrogen Peroxide; Schumb, W. C; Satterfield, C. N.; and Wentworth, R. L; Reinhold Publishing Corporation, New York, N.Y., 1955; pg 469). Iron (III) complexes used with hydrogen peroxide show an ability to oxidize complex pesticides (Sun, Y and Pignatello, J. J. Agr. Food. Chem, 40:322-37, 1992). However Iron (III) is a poor catalyst for activation of persulfate.

The U.S. Environmental Protection Agency (USEPA) has established maximum concentration limits for various contaminate compounds. Very low and stringent limits on the amount of halogenated organic compounds in drinking water exist. For example, the maximum concentration of solvents such as trichloroethylene, tetrachloroethylene, and carbon tetrachloride in drinking water is 5 mu.g/L, and the maximum concentration of chlorobenzenes, polychlorinated biphenyls (PCBs), and ethylene dibromide are 100 mu.g/L, 0.5 mu./L, and 0.05 mu.g/L, respectively. Satisfying these limits during remediation of contaminated soils is often virtually impossible using existing technologies.

A need therefore exists for a method of remediation that overcomes the deficiencies of the prior art.

SUMMARY OF THE INVENTION

The present invention is a method for remediation of soil, sediment, clay, rock, and the like (hereinafter collectively referred to as "soil") and groundwater (i.e., water found underground in cracks and spaces in soil, sand and rocks), process water (i.e., water resulting from various industrial processes) or wastewater (i.e., water containing domestic or industrial waste) contaminated with volatile organic compounds, semi-volatile organic compounds, pesticides or herbicides. In addition, it may be used to treat sludges, sands or tars.

The disclosed method uses a composition comprising one or more solid phase peroxygen compounds and zero valent iron under conditions sufficient to oxidize contaminates such as VOCs, SVOCs, herbicides and pesticides in contaminated soils and water.

The method of oxidizing an organic compound entails contacting the organic compound with a composition comprising a water soluble peroxygen compound and zero valent iron. The organic compound may be present in an environmental medium including soil, groundwater, process water or wastewater. The water soluble peroxygen compound may be any of sodium persulfate, potassium persulfate, ammonium persulfate and mixtures thereof, such as mixtures of dipersulfate and monopersulfate, preferably sodium persulfate. The concentration of peroxygen compound in the solution is about 0.5 mg/L to about 250,000 mg/L and the zero valent iron and the sodium persulfate may be present in a suspension. The concentration of the zero valent iron in the suspension is about 1 ppm to about 1000 ppm on a metal basis. Preferably, zero valent iron contacts the organic compound prior to contacting the organic compound with the peroxygen compound. Organic compounds which may be oxidized include trichloroethylene (TCE), vinyl chloride, tetrachloroethylene (PCE), methylene chloride, 1,2-dichloroethane, 1,1,1-trichloroethane (TCA), carbon tetrachloride, chloroform, chlorobenzenes, benzene, toluene, xylene, ethyl benzene, ethylene dibromide, methyl tertiary butyl ether, polyaromatic hydrocarbons, polychlorobiphenyls, phthalates, 1,4-dioxane, nitrosodimethyl amine, and methyl tertbutyl ether.

DESCRIPTION OF THE PREFERRED EMBODIMENTS

Generally, the disclosed method entails oxidation of organic contaminates such as VOCs, SVOCs, pesticides and herbicides present in soil and water. The method entails contacting contaminated soils and waters with a composition comprising a water soluble peroxygen compound and zero valent iron to oxidize contaminates such as VOCs, SVOCs, polyaromatic hydrocarbons, polychlorobiphenyls, pesticides and herbicides. Examples of these contaminates include but are not limited to chlorinated solvents such as trichloroethylene (TCE), vinyl chloride, tetrachloroethylene (PCE), methylene chloride, 1,2-dichloroethane, 1,1,1-trichloroethane (TCA), carbon tetrachloride, chloroform, chlorobenzenes. Other examples of VOCs and SVOCs include benzene, toluene, xylene, ethyl benzene, ethylene dibromide, methyl tertiary butyl ether, polyaromatic hydrocarbons, polychlorobiphenyls, phthalates, 1,4-dioxane, nitrosodimethyl amine, and methyl tertbutyl ether.

In a first aspect, oxidation of organic contaminates such as those listed above may be accomplished by injection of an amount of a suspension of zero valent iron in an aqueous solution of one or more solid phase water soluble peroxygen compounds into the contaminated soils or waters. As used herein, "solid phase water soluble peroxygen compound" means a compound which is solid and water soluble at room temperature and which contains an O—O group. Examples of solid phase water soluble peroxygen compounds which may be used include dipersulfates such as sodium persulfate, potassium persulfate and ammonium persulfate. The most preferred dipersulfate is sodium persulfate as it has the greatest solubility in water and is least expensive. Moreover, it generates sodium and sulfate upon reduction, both of which are relatively benign from environmental and health perspectives. Potassium persulfate and ammonium persulfate are examples of other persulfates which might be used, preferably sodium persulfate as it has the greatest solubility in water and is least expensive. Moreover, it generates sodium and sulfate upon reduction, both of which are relatively benign from environmental and health perspectives. Potassium persulfate and ammonium persulfate are examples of other persulfates which might be used. Potassium persulfate, however, is an order of magnitude less soluble in water than sodium persulfate; and ammonium persulfate is even less desirable as it may decompose into constituents such as ammonium ion which are potential health concerns.

The particle size of the zero valent iron in the suspension may vary from nanoscale, i.e., about 10 nanometers to about 1 micron to micro scale, i.e., from about 1 micron to about 5 microns. Zero valent iron within these size ranges is generally commercially available. Preferably, the suspension includes zero valent iron in an aqueous solution of sodium persulfate ($Na_2S_2O_8$). The concentration of the zero valent iron in the suspension may vary from about 1 to about 1000 ppm on a metal basis.

The peroxygen compound and zero valent iron may be mixed together and the composition shipped or stored prior to being combined with water in the same vessel prior to injection. Solutions of the peroxygen compound and the iron can be injected simultaneously or sequentially in which case the composition is formed in the environmental medium. If injected sequentially, it is preferable that the iron is injected first. In another embodiment, the zero valent iron may be in a permeable reaction barrier (PRB) and the persulfate introduced into the environmental medium upgradient from the PRB. It is also preferred that enough peroxygen compound be injected to satisfy the soil oxidant demand, compensate for any decomposition and oxidize and destroy the majority if not all of the organic compounds. Soil oxidant demand, (SOD), is the loss of persulfate due to reaction with soil matrix components as well as through auto-decomposition of the persulfate, as well as the chemical oxidant demand, and to compensate for any decomposition of the peroxygen compound.

One method for calculating the preferred amount of peroxygen compound to be used per unit soil mass (for an identified volume of soil at the site) is to first determine the minimum amount of peroxygen compound needed to fully satisfy soil oxidant demand per unit mass of uncontaminated soil. A contaminated soil sample from the identified volume of soil is then treated with that predetermined (per unit mass) amount of peroxygen compound; and the minimum amount of peroxygen compound required to eliminate the organic compounds in that treated sample is then determined. Chemical reaction stoichiometry governs the mass/mass ratios and thus the total amount required to achieve the desired result. In actuality the amount of peroxygen compound injected into various locations at a single contaminated site will vary depending upon what is learned from the core samples and other techniques for mapping what is believed to be the subsurface conditions.

SOD also may be calculated according to the formula (I):

$$SOD = V^*(C_0 - C_f)/m_s \qquad (I)$$

Where V=volume of the groundwater used in the sample
$C_0$=initial concentration of persulfate at time 0
$C_f$=concentration of persulfate after 48 hours
$M_s$=mass of soil used in the sample Depending upon the type of soil, target compounds, and other oxidant demand at the site, the concentrations of peroxygen compound in the solution used in the present invention may vary from about 0.5 mg/L to greater than about 250,000 mg/L. The preferred concentrations are a function of the soil characteristics, including the site-specific oxidant demands. Hydrogeologic conditions govern the rate of movement of the chemicals through the soil, and those conditions must be considered together with the soil chemistry to understand how best to perform the injection. The techniques for making these determinations and performing the injections are well known in the art. For example, wells or borings can be drilled at various locations in and around the suspected contaminated site to determine, as closely as possible, where the contamination is located. Core samples can be withdrawn, being careful to protect the samples from atmospheric oxidation. The samples can then be used to determine soil oxidant demand, chemical (e.g. VOC) oxidant demand and the oxidant stability existing in the subsurface. The precise chemical compounds in the soil and their concentration can be determined. Contaminated groundwater can be collected. Oxidants can be added to the collected groundwater during laboratory treatability experiments to determine which compounds are destroyed, in what order and to what degree, in the groundwater. It can then be determined whether the same oxidants are able to destroy those chemicals in the soil environment.

The goal is for the concentration of peroxygen compound in the injected solution to be just enough to result in the peroxygen compound reaction front traveling throughout the area of contamination requiring treatment in sufficient quantity to oxidize the contaminants present. (The saturated soil zone is the zone of soil which lies below the water table and is fully saturated. This is the region in which groundwater exists and flows.) In certain saturated zones where the natural velocity of the groundwater is too slow for the purposes of treatment within a certain timeframe, the velocity of groundwater can be increased by increasing the flow rate of the injected persulfate solution or installation of groundwater extraction wells to direct the flow of the injected peroxygen compound solution. Certain soils to be treated may be in unsaturated zones and the method of peroxygen compound injection may be based on infiltration or trickling of the peroxygen compound solution into the subsurface to provide sufficient contact of the soils with the injected chemicals. Certain soils and conditions will require large amounts of peroxygen compound to destroy soil oxidant demand, while other soils and conditions might not. For example, sandy soils having large grain size might have very little surface area, very little oxidizable compounds and therefore very little soil oxidant demand. On the other hand, silty or clayey soils, which are very fine grained, would have large surface area per unit volume. They are likely to also contain larger amounts of oxidizable compounds, and also may cause a greater degree of decomposition of the peroxygen compound and thus have a higher overall soil oxidant demand.

For in situ soil treatment, injection rates must be chosen based upon the hydro geologic conditions, that is, the ability of the oxidizing solution to displace, mix and disperse with existing groundwater and move through the soil. Additionally, injection rates must be sufficient to satisfy the soil oxidant demand and chemical oxidant demand in a realistic time frame. It is advantageous to clean up sites in both a cost effective and timely manner. Careful evaluation of site parameters is crucial. It is well known that soil permeability may change rapidly both as a function of depth and lateral dimension. Therefore, injection well locations are also site specific. Proper application of any remediation technology depends upon knowledge of the subsurface conditions, both chemical and physical, and this process is not different in that respect.

Any solid phase water soluble persulfate compound can be used including monopersulfates and dipersulfates. Dipersulfates are preferred because they are inexpensive and survive for long periods in the groundwater saturated soil under typical site conditions.

This compositions of the present invention comprising a solid state, water soluble peroxygen compound and zero valent iron may also be used ex situ to treat quantities of contaminated soil which have been removed from the ground.

In accordance with the method of the present invention the contaminants are treated in an environmental medium. As used herein "environmental medium" refers to an environment where contaminants are found including, without limitation, soil, rock, groundwater, contaminated plumes, process water, waste water and the like.

The process of the present invention may be carried out in situ or ex situ. In situ treatment is conducted in the physical environment where the contaminant(s) are found. Ex situ treatment involves removal of the contaminated medium from the location where it is found and treatment at a different location.

In order to describe the invention in more detail, the following examples are set forth:

EXAMPLE 1

Stability of Persulfate/Zero Valent Iron

The stability of persulfate in the presence of zero valent iron (ZVI) was demonstrated by the following procedure. The following abbreviations are used to identify the materials/equipment:
 ZVI—zero valent iron Fe (0)
 FeEDTA—Fe (II) chelated with ethylenediaminetetraacetic acid (EDTA)
 VOA vials—vials used for volatile organic analysis
 DI—deionized Experimental Procedure:
 One liter of DI water was added to each VOA vial
 Sodium persulfate was added to the VOA vials in three different dosages: 1, 3 and 5 grams
 FeEDTA was added to one set of three vials containing the three different persulfate dosages at a concentration of 0.2 g of Fe in each vial
 ZVI was added to one set of three vials containing the three different persulfate dosages at a concentration of 0.2 g of Fe in each vial
 One set of three vials at the three different persulfate dosages were not dosed with iron
 Persulfate concentrations were measured after one week and two weeks via standard titration methods The percent of persulfate remaining (as an average of the three persulfate dosages for that time period) after these times is shown in Table 1:

TABLE 1

| Activator | % Persulfate Remaining | |
|---|---|---|
|  | 1 Week | 2 Weeks |
| No Fe | 88.6 | 71.5 |
| Fe-EDTA | 74.9 | 61.5 |
| ZVI | 66.6 | 51.1 |

As can be seen from Table 1, persulfate showed approximately equivalent stability in the presence of ZVI as in the presence of FeEDTA

EXAMPLE 2

Treatment of Organic Compounds

The efficacy of using a combination of persulfate and zero valent iron to treat various organic compounds was shown by the following procedure. The following abbreviations are used to identify the materials/equipment:
 ZVI—zero valent iron Fe (0)
 FeEDTA—Fe (II) chelated with ethylenediaminetetraacetic acid (EDTA)
 VOA vials—vials used for volatile organic analysis
 DI—deionized The Following Organic Contaminants were Used:
 Chlorinated ethenes, or "chloroethenes", refers to a mixture of tetrachloroethene, trichloroethene, cis-1,2-dichloroethene, and 1,1-dichloroethene,
 BTEX refers to a mixture of benzene, toluene, ethylbenzene and xylene
 Chlorinated benzenes, or "chlorobenzenes", refers to a mixture of chlorobenzene, 1,2-dichlorobenzene, and 1,3-dichlorobenzene
 "Oxygenates" refers to alcohols and ethers including methyl-tert-butyl ether (MTBE)

Experimental Procedure:
 One liter of DI water was added to each VOA vial
 1.0 g of sodium persulfate was added to each VOA vial
 Vials were dosed with either ZVI, Fe(II) ammonium sulfate or FeEDTA to achieve 0.5 g of Fe in the vial. For ZVI/Fe(II) combinations, equal amounts were utilized to achieve 0.5 g of Fe
 Vials were dosed with a stock solution of the above identified contaminants to achieve a contaminant dosage of approximately 10-20 mg/L.

The VOA vials were filled to achieve zero headspace
The vials were stored at room temperature for 7 days. Following 7 day reaction period, vials were stored at 4° C. for analysis. Analyses were performed on a gas chromatograph/mass spectrometer utilizing USEPA SW-846, Method 8260B.

The results in ug/L are shown in Table 2, compared to the initial concentration indicated by Time=0:

TABLE 2

|  | Time = 0 | DI Water Control | Persulfate Alone | Persufate + Fe II | Persulfate + ZVI |
|---|---|---|---|---|---|
| Chloroethenes | 49,372 | 44,419 | 34,000 | 0 | 0 |
| Chlorobenzenes | 38,371 | 41,417 | 25,444 | 0 | 0 |
| BTEX | 50,749 | 46,146 | 8324 | 0 | 0 |
| Oxygenates | 42,747 | 43,303 | 34387 | 0 | 6,458 |

As can be seen from Table 2, the combination of persulfate and ZVI was effective in treating the indicated organic compounds.

EXAMPLE 3

Treatment of Organic Compounds

The procedure described in Example 2 was used to evaluate the efficacy of using a combination of persulfate and zero valent iron to treat various organic compounds. In addition to those in Example 2, the following organic contaminants were used:

1,1,1, TCA refers to 1,1,1-trichloroethane
1,1 DCA refers to 1,1-dichloroethane
1,2 DCA refers to 1,2-dichloroethane The results are shown in Table 3.

TABLE 3

| | ug/L | | | | | | |
|---|---|---|---|---|---|---|---|
| | Time = 0 | Control | ZVI Only | ZVI/ Persulfate | Fe II Persulfate | ZVI/Fe II Persulfate | Persulfate Only |
| Total Chlorinated Ethenes | 40364 | 40737 | 30993 | 104 | 0 | 0 | 19904 |
| Total BTEX | 43124 | 44139 | 44994 | 0 | 0 | 0 | 7395 |
| 1,1,1-TCA | 11423 | 12451 | 650 | 2393 | 12419 | 1451 | 10667 |
| 1,1-DCA | 11912 | 12967 | 15623 | 9350 | 8150 | 9090 | 11450 |
| 1,2-DCA | 14530 | 14879 | 15681 | 10567 | 9900 | 9750 | 13596 |
| Carbon Tetrachloride | 11681 | 12619 | 786 | 0 | 11864 | 0 | 10539 |
| Chlorobenzene | 12103 | 12046 | 12743 | 0 | 0 | 0 | 4331 |
| MTBE | 12229 | 12557 | 13270 | 0 | 0 | 106 | 11076 |

As can be seen from Table 3, ZVI activated persulfate destroyed a broad range of contaminants. Also, ZVI can be used in combination with Fe II to activate persulfate.

The invention claimed is:

1. A method of oxidizing a contaminant present in an environmental medium, said method comprising contacting the contaminant with a composition comprising a water soluble persulfate compound and zero valent iron wherein the persulfate compound is a dipersulfate.

2. A method as in claim 1, wherein the dipersulfate is selected from sodium, potassium or ammonium persulfate or a combination thereof.

3. A method as in claim 1, wherein the persulfate compound is a combination of a dipersulfate and monopersulfate.

4. A method as in claim 1, wherein the environmental medium is selected from soil, groundwater, process water or wastewater.

5. A method as in claim 1, wherein the contaminant is an organic compound selected from the group consisting of volatile organic compounds, semi-volatile organic compounds, polyaromatic hydrocarbons, polychlorobiphenyls, pesticides and herbicides.

6. A method as in claim 1 wherein the zero valent iron has a nanoscale particle size of from about 10 nanometers to about 1 micron.

7. A method as in claim 1 wherein the zero valent iron has a micro scale particle size of from about 1 micron to about 5 microns.

8. A method as in claim 1 wherein the concentration of the persulfate compound is from about 0.5 mg/L to about 250,000 mg/L.

9. A method as in claim 1 wherein the concentration of the zero valent iron is from about 1 ppm to about 1000 ppm on a metal basis.

10. A method as in claim 1 wherein the oxidation is performed in situ or ex situ.

11. A method as in claim 1 wherein the water soluble persulfate compound is sodium persulfate.

12. A method as in claim 11 wherein the zero valent iron and the sodium persulfate are present in a suspension.

13. A method as in claim 5 wherein the organic compound is selected from the group consisting of trichloroethylene (TCE), vinyl chloride, tetrachloroethylene (PCE), methylene chloride, 1,2-dichloroethane, 1,1,1-trichloroethane (TCA), carbon tetrachloride, chloroform, chlorobenzenes, benzene, toluene, xylene, ethyl benzene, ethylene dibromide, methyl tertiary butyl ether, polyaromatic hydrocarbons, polychlorobiphenyls, phthalates, I,4-dioxane, nitrosodimethyl amine, and methyl tertbutyl ether.

* * * * *